United States Patent
Khan et al.

(10) Patent No.: US 7,023,794 B2
(45) Date of Patent: Apr. 4, 2006

(54) METHOD AND ARCHITECTURE FOR REDUNDANT SS7 DEPLOYMENT IN A VOICE OVER IP ENVIRONMENT

(75) Inventors: Romel Khan, Eatontown, NJ (US); Jeffrey S. Skelton, Perrineville, NJ (US)

(73) Assignee: Net2Phone, Inc., Newark, NJ (US)

( * ) Notice: Subject to any disclaimer, the term of this patent is extended or adjusted under 35 U.S.C. 154(b) by 705 days.

(21) Appl. No.: 09/683,753

(22) Filed: Feb. 11, 2002

(65) Prior Publication Data

US 2003/0152064 A1  Aug. 14, 2003

(51) Int. Cl.
*H04L 12/26* (2006.01)
(52) U.S. Cl. ............... 370/219; 370/220; 370/216
(58) Field of Classification Search ........ 370/216–220, 370/221–224
See application file for complete search history.

(56) References Cited

U.S. PATENT DOCUMENTS

| | | | |
|---|---|---|---|
| 5,473,599 A * | 12/1995 | Li et al. | 370/219 |
| 5,915,013 A * | 6/1999 | Mintz et al. | 379/230 |
| 6,005,841 A * | 12/1999 | Kicklighter | 370/217 |
| 6,081,591 A * | 6/2000 | Skoog | 379/230 |
| 6,327,260 B1 * | 12/2001 | McGrew | 370/385 |
| 6,456,626 B1 * | 9/2002 | Whiting et al. | 370/409 |
| 6,711,357 B1 * | 3/2004 | Brewer et al. | 398/54 |
| 6,778,491 B1 * | 8/2004 | Fourcand et al. | 370/217 |

\* cited by examiner

*Primary Examiner*—Ricky Ngo
*Assistant Examiner*—Nguyen Ngo
(74) *Attorney, Agent, or Firm*—Davidson Berquist Jackson & Gowdey LLP (57) ABSTRACT

18A method and system for controlling the switching and control operation of at least one of an Softswitch system, an Signal Transfer Points (STP) and a gateway (GW) (e.g., in a SS7 signaling environment). By providing support for redundancy, a second switch system can take over the routing and control operations of a first switch system when the first switch system experiences difficulty. Difficulty may be any one of several forms (e.g., switch crash, congestion, hardware failure).

18 Claims, 5 Drawing Sheets

METHOD AND ARCHITECTURE FOR REDUNDANT SS7 DEPLOYMENT IN A VOICE OVER IP ENVIRONMENT

BACKGROUND OF INVENTION

1. Field of the Invention

The present invention is directed to a method and architecture for providing redundant SS7 signaling control in a packet voice network environment (e.g., a Voice over IP environment).

2. Discussion of the Background

SS7 is a reliable and widely used protocol in the circuit switched PSTN world for managing telephone calls (e.g. setting up & tearing down a call on a particular voice channel or circuit). SS7 networks often include STPs (Signal Transfer Points), which are fast & efficient switches for SS7 packets. Then, SS7 signaling forms a separate physical network from the voice circuits for passing signaling information. Compared to in-band signaling (e.g., CAS MF), SS7 is much faster, reduces fraud, and enables adding value-added services. The switches terminate voice trunks or circuits and telephone lines, and connect to the SS7 network by connecting to a "home" STP pair through signaling links known as A-links. Examples of switches used in the PSTN include 5ESS from Lucent & DMS500 from Nortel.

For detailed specifications on the SS7 standards, readers are referred to the American and International standards: ANSI T1.111, ANSI T1.113, Telcordia GR-246, ITU-T Q.7xx series. Each of those standards is incorporated herein by reference in its entirety.

Figure 1:
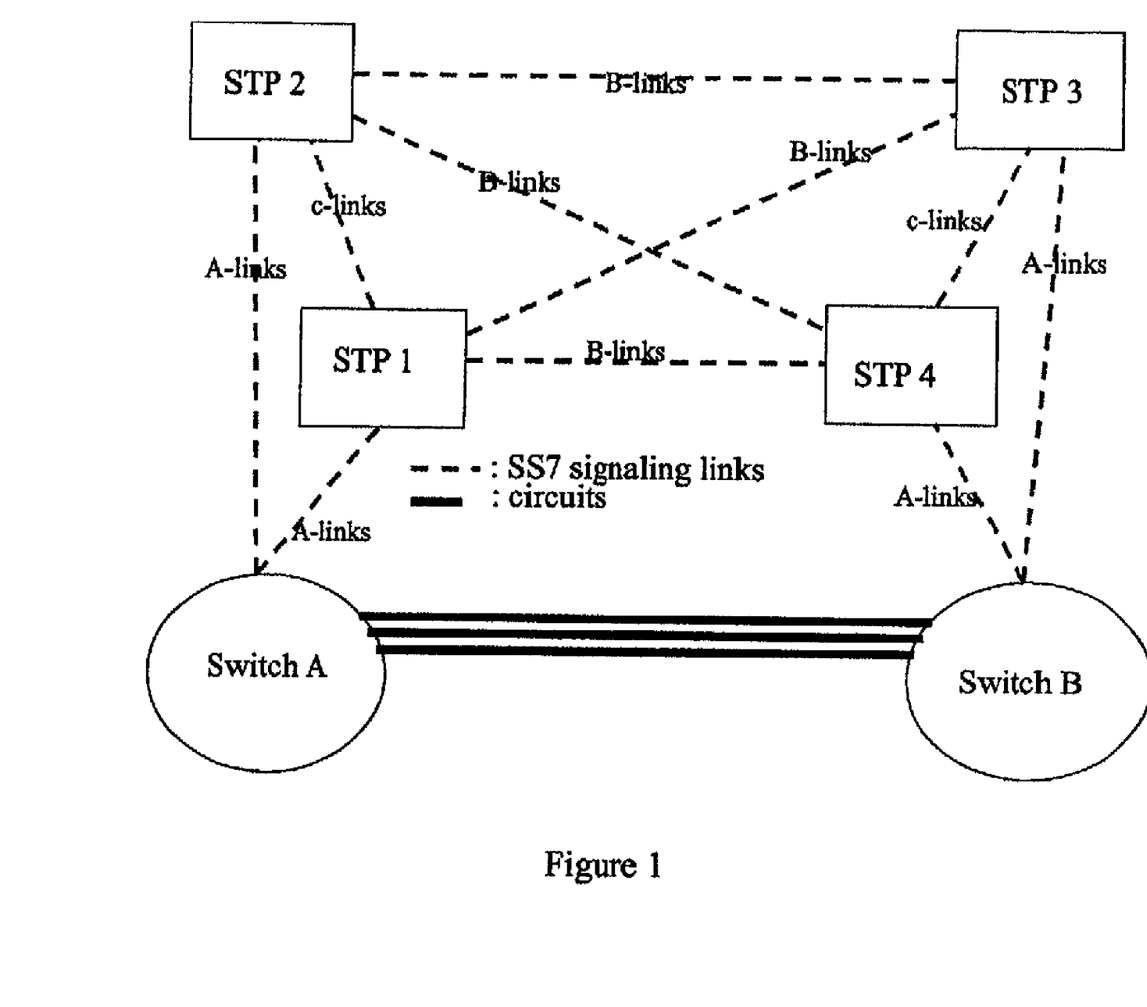
FIG. 1 is a general functional diagram representing an exemplary SS7 network.

FIG. 1 is a general functional diagram representing an exemplary SS7 network. As shown in FIG. 1, the switches terminate voice circuits that are controlled through the signaling messages flowing over the signaling network. A switch is located in a central office. By way of example, if switch A fails (or gets destroyed, for example, by an earthquake), all the voice circuits controlled by the switch become unusable (even if the controlled circuits were terminated to a remote location box that is slave to the switch A's controlling CPUs). That is how SS7 is deployed today.

Known voice over IP (VoIP) networks use other signaling protocols for call connection within the IP environment. Examples of these signaling protocols are Media Gateway Control Protocol (MGCP) described in IETF standard RFC 2705, MEGACO protocol described in IETF standard RFC 2805, Session Initiation Protocol (SIP) described in IETF standard RFC 2543, and ITU-T H.323 protocol suite. However, often calls originate from a caller and terminate to a callee in the circuit switched PSTN. Therefore, VoIP networks may have to connect to the PSTN for call origination and/or termination. Although VoIP networks have the choice to use CAS (Channel Associated Signaling) or ISDN signaling, SS7 should be the signaling of choice to connect to the PSTN because of the advantages SS7 brings.

Similar to the SS7 deployment in the circuit switched environment case mentioned previously, if all SS7 signaling links to a VoIP network switch (termed as Softswitch (SSC)) fails, then all the voice circuits controlled by the switch become unusable.

SUMMARY OF INVENTION

According to one aspect of the present invention, a method and architecture enable any available VoIP circuits to be controlled from a secondary location even after the primary controlling location becomes unavailable. Such embodiments are preferably used in environments where the two locations are geographically distant from each other. The distance separating the two locations may be affected by a number of factors (e.g., reduction in likelihood that links to both locations will experience problems and likelihood that power problems will effect both locations).

This, and other aspects of the present invention, are achieved utilizing a messaging protocol (e.g., an SS7 protocol) in a Voice over IP (VoIP) environment.

BRIEF DESCRIPTION OF DRAWINGS

A more complete appreciation of the invention and many of the attendant advantages thereof will become readily apparent with reference to the following detailed description, particularly when considered in conjunction with the accompanying drawings, in which.

DETAILED DESCRIPTION

As an aid to understanding the abbreviations used herein, several abbreviations and their meanings are provided below.

CAS—Channel Associated Signaling

IAM—Initial Address Message used in SS7 protocol to request call setup

PSTN—Public Switch Telephone Network

REL—Release Complete used in SS7 protocol to request call teardown

SIP—Session Initiation Protocol

SSC—Soft Switch

SS7—Signaling System 7

STP—Signal Transfer Point

VoIP—Voice Over Internet Protocol

Figure 2:
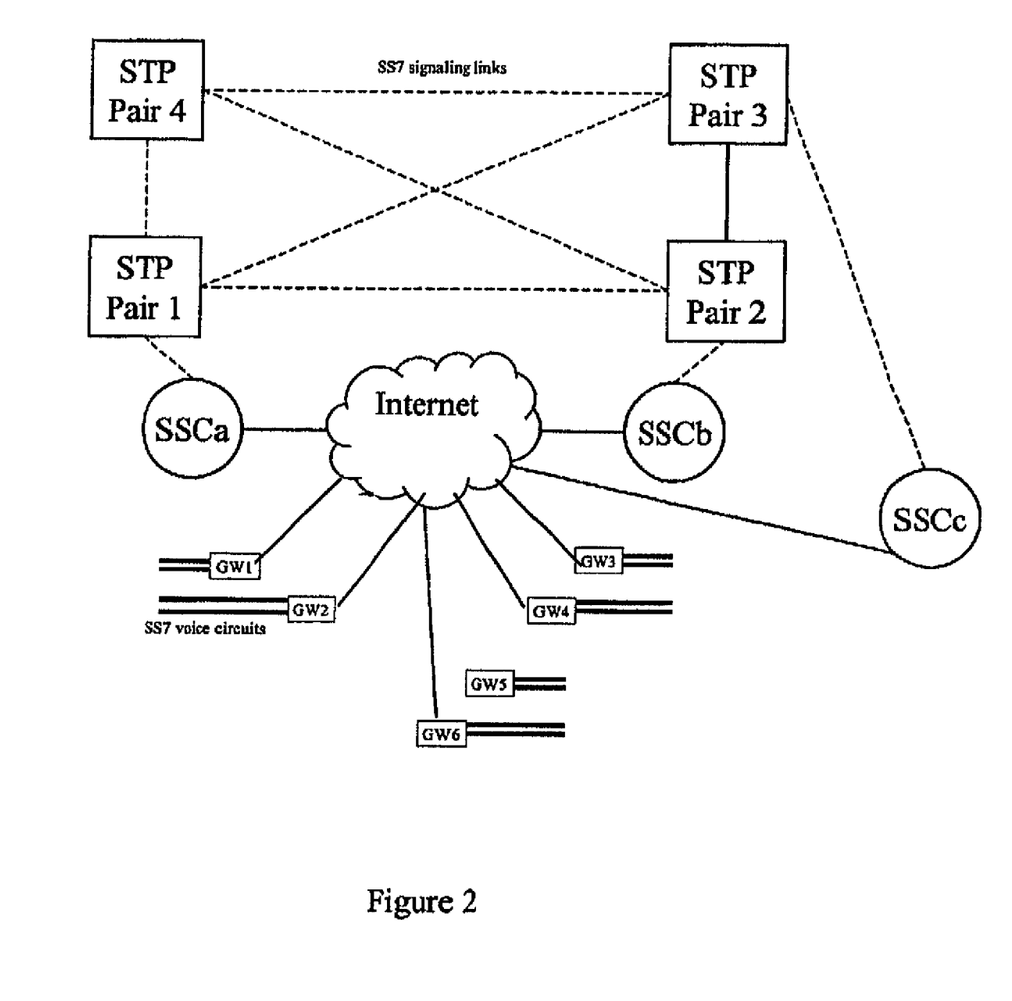
FIG. 2 is a general functional diagram representing a VoIP system utilizing SS7 signaling according to one aspect of the present invention.

Referring now to the drawings, wherein like reference numerals designate identical or corresponding parts throughout the several views, FIG. 2 is a general functional diagram representing a VoIP system utilizing SS7 signaling according to one aspect of the present invention. In FIG. 2, each softswitch (SSCa, SSCb and SSCc) controls the gateway (GW) only in its corresponding domain. In this example network, the GWs in domain of SSCa are GW1 and GW2. Similarly, the GWs in the domain of SSCb are GW3 and GW4, while GWs in the domain of SSCc are GW5 and GW6.

An SS7 capable SSC will connect to its home STP pair using A-links. In FIG. 2, STP pair 1 is SSCa's home STP pair, STP pair 2 is SSCb's home STP pair, and STP pair 3 is SSCc's home STP pair. STP pairs 1, 2 and 3 could potentially be a combination of the same STPs. Each SSC has an SS7 address known as a point code (PC). For reference, SSCa's point code is referred to herein as PC1, SSCb's point code is referred to herein as PC2, and SSCc's point code is referred to herein as PC3. To control the voice circuits in its domain, SSCs send appropriate SS7 messages over the SS7 links and VoIP control protocol messages over the IP network to the respective GWs. In a non-backup environment or a co-located backup environment, if an SSC system crashes, then all the circuits controlled by that SSC becomes unusable, even if the GWs are functional. Similarly, if an SSC had a collocated backup SSC', then the backup SSC' likely also would have crashed because of the collocation.

According to the present invention, if an SSC, such as, SSCa (with any backup SSC) crashes, then another remote SSC (such as SSCb in FIG. 2) will be capable of controlling the circuits originally controlled by SSCa with no manual intervention needed and no impact on other carriers that will have trunks to this VoIP carrier. This can be enabled by: (1) allowing GWs controlled by SSCa to also be controlled by SSCb where SSCb is provisioned with PC1 and controls the circuits controlled by PC1 (which can be the same circuits SSCa controls); and (2) provisioning a SS7 route over the STP SS7 network to SSCb for PC1 with lower priority than the route to SSCa for PC1.

SSCb under normal condition will only process for PC2. When SSCa goes down completely, SSCb may become aware of it in a number of ways. For example, SSCb may start receiving SS7 messages destined for PC1. SSCb will then start processing for PC1, as well as for its own PC2. When SSCa comes back up, SSCb will stop processing for PC1 since SSCa can do the job now.

Generally, the present invention provides that (1) multiple SSCs can be backup for a single SSC (load sharing), (2) a backup SSC can partially take over from a partially failed or heavily congested SSC (load sharing), and (3) providing backup SSCs for another carrier can be used for control (revenue generation).

In one embodiment of the present invention, SSCs communicate with each other using SIP and with their controlled GWs using MGCP or MEGACO/H.248 protocol. SSCb is SSCa's backup which means that if SSCa becomes completely non-functional or heavily congested, SSCb will process traffic as PC1 in addition to its normal traffic. Routes to backup SSCs are routes of lower priority.

Figure 3:
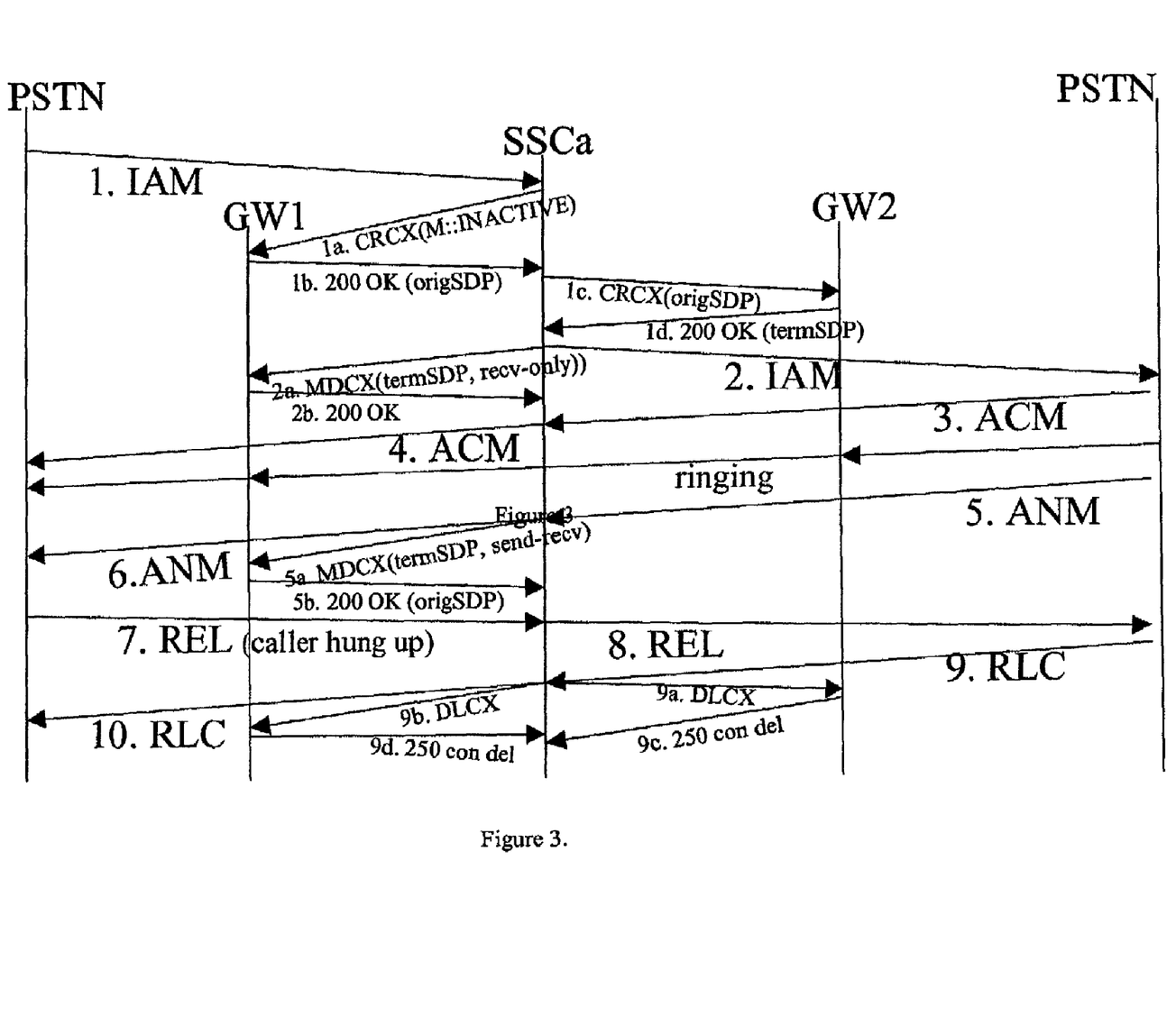
FIG. 3 is a ladder diagram of a first call control scenario.

Turning now to FIG. 3, call setup between a call originator (on a circuit terminated on GW1) and a call termination (on a circuit terminated on GW2) utilizes the illustrated signaling flow. As described above, SSCa controls the GWs using MGCP signaling. FIG. 3 is described step by step as follows:

1. A caller makes a call. A PSTN switch sends the call request to the Voice over IP (VoIP) Softswitch (SSCa) using SS7 signaling. This corresponds to the SS7 ISUP IAM (Initial Address Message) message in step 1 in the FIG. 3. A voice circuit that connects to originating gateway, GW1, is also seized.

1.a SSCa then sends indications to GW1 to create a connection by binding the PSTN voice circuit to an IP session description using MGCP signaling in an inactive mode (i.e. the GW neither sends nor receives packets).

1.b GW1 acknowledges the connection creation and sends back the session description termed as origSDP.

1.c SSCa sends an indication to the terminating gateway, GW2, to create a connection with the ability to both send and receive data. SSCa includes the session description from GW1.

1.d GW2 acknowledges the connection creation and sends back the terminating side session description termed as termSDP.

2. SSCa then sends connection request to the terminating PSTN switch. This is an SS7 ISUP IAM message.

2.a SSCa also sends an MGCP message to GW1 to modify the connection with termSDP information and place the GW1 in receive only mode for the call. Preferably, the the GW is placed in receive only mode so that ringing from the far end can be heard by the caller and fraud is minimized by preventing the originating data to flow towards the terminating side).

2.b The GW1 acknowledges the message.

When the callee starts ringing, an SS7 ISUP ACM (Address Complete Message) is received from the terminating PSTN side.

SSCa passes the ACM onwards (step 4). Ringing will pass from terminating side PSTN to GW2, from GW2 to GW1 (in packetized IP), and then from GW1 to PSTN.

5–6. When callee answers, Answer Message (ANM) is received by the SSCa and is passed onwards. Session connection of the originating GW is modified by sending an MGCP modify connection (MDCX) message so it can now both send & receive data (e.g. voice packets). The parties start conversing.

7–8. After the caller hangs up, SS7 ISUP REL (Release) message is received from the PSTN and is passed onwards.

9–10. Lastly, an SS7 ISUP RLC (Release Complete) message comes back afterwards and is passed onwards.

9a–9b. Connections to the GWs are deleted using MGCP signaling.

9c–9d. The connection deletions are acknowledged by the GWs.

Figure 4:
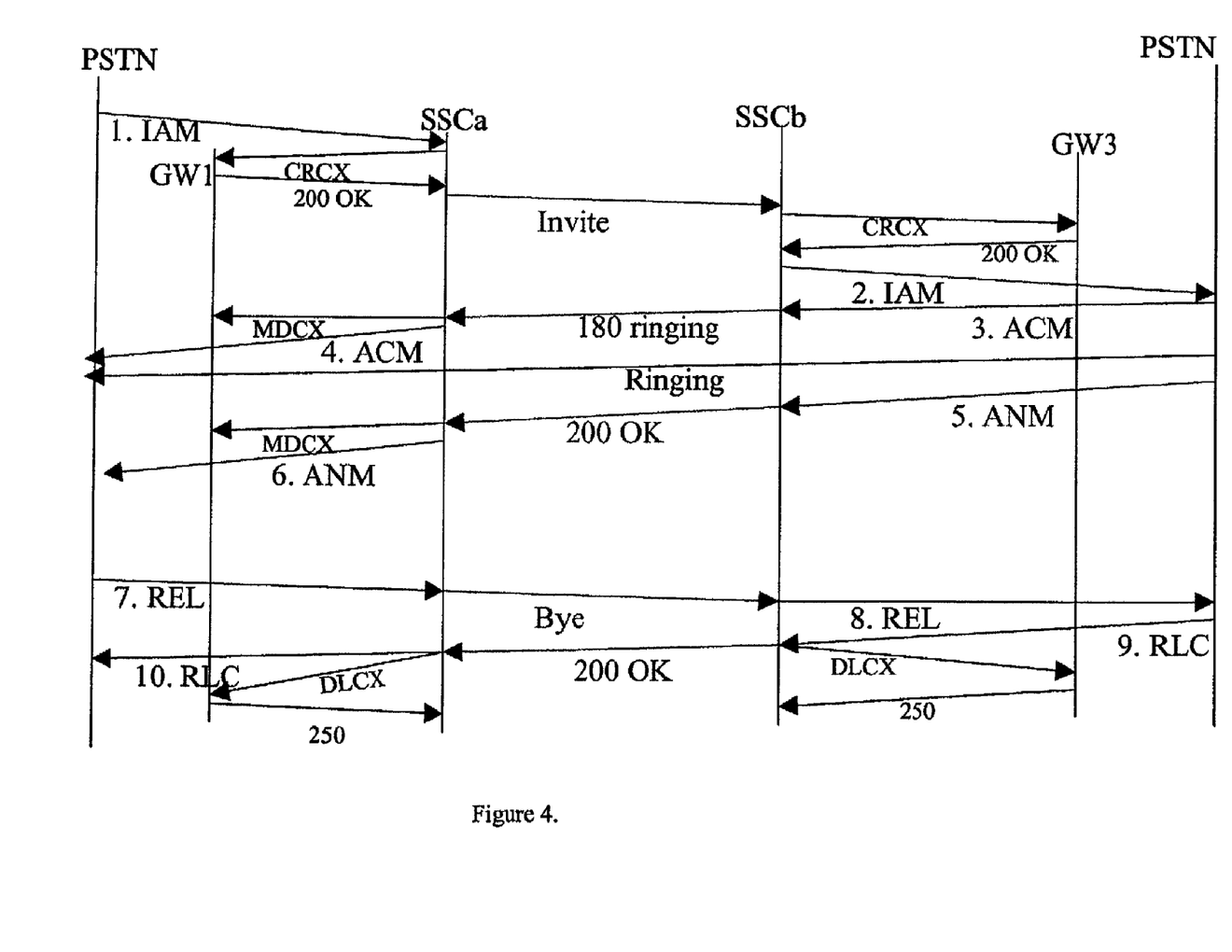
FIG. 4 is a ladder diagram of a second call control scenario.

FIG. 4 provides an illustration of an analogous call setup between a call originator (on a circuit terminated on GW1) and a call termination (on a circuit terminated on GW3). GW1 is controlled by SSCa while GW3 is controlled by SSCx. Again, SSCs control the GWs using MGCP signaling, and, in addition, communication between the SSCs is via SIP. FIG. 4 is similar to FIG. 3 except that FIG. 4 illustrates some SIP signaling messages between the two SSCs. Generally, an SIP INVITE message is sent to indicate a call setup request. SIP 180 ringing interworks with ISUP ACM. SIP 200 OK for INVITE interworks with ISUP ANM. SIP BYE interworks with ISUP REL.

The use of redundant SSC's will be described below with reference to six different scenarios. As would be appreciated, the scenarios are illustrative of functions that can be handled redundantly and the situations in which it can be so handled. One of ordinary skill in the art would understand that, accordingly, the present invention is not limited to any one of those scenarios.

Scenario 1: Failover to Backup SSCb when all Links to SSCa Fails.

In the example, transient calls are dropped, and active calls may be dropped and may or may not be billed for any period it has been active.

1. A series of calls are connected using SSCa where SSCa can play the role of an originating and/or terminating switch. SSCa goes through signaling flows (e.g., as shown in FIGS. 3 and 4). SSCb is designated as SSCa's backup site. Under normal condition, SSCa communicates with all other SSCs including SSCb using SIP, and SSCb does not send or receive ISUP messages using PC1 (which is the point code associated with SSCa). The SSCs communicate with the respective GWs that they control using MGCP.

2. At some point SSCa fails implying that all the signaling links from the SSCa to the STP fails.

3. SS7 networks reroutes traffic through standard procedures (e.g., forced re-routing as described in ANSI T1.111) to re-route to routes of lower priority to SSCb.

4. To turn on processing for PC1, SSCb either receives an ISUP message using PC1 from the SS7 network or an MGCP message/response from a GW controlled by SSCa (such as, GW1 or GW2), whichever happens first. (An alternate method to turn on processing will be described in a later scenario.)

5. SSCb turns on processing for PC1:

a. SSCb's route tables will be updated as follows: Any destination that needs to be routed over SSCa will be changed to be processed by SSCb itself.

b. SSCb queries each endpoint of gateways under control of PC1 (i.e. GW1 & GW2 in the example) to obtain connection and state information. SSCb requests the GWs to send all messages/responses to SSCb from now on. An endpoint will be directly correlated to an ISUP Circuit Identification Code (CIC) (for example, using a one-to-one mapping pre-provisioned in SSCb).

Through this auditing mechanism, SSCb will figure out whether a call is in answer state or pre-answer state. SSCb will also figure out the SSC which is handling the other leg of the call and whether the endpoint (associated with SSCa) is serving an outgoing or incoming leg of a call. This can be determined using the following logic:

The SSCb, through MGCP Audit Endpoint and Audit Connection messages, will be able to obtain the current mode of the connection (e.g. inactive, receive-only, send-receive), and the remote connection descriptor which contains the IP address of the far-end GW for each endpoint with a connection. SSCb will have pre-provisioned information that SSCb can use to map the far-end GW to the SSC (this can be SSCa, SSCb, or a $3^{rd}$ SSCc) that controls that GW. If the mode of the connection is inactive or receive-only, then this endpoint, $E_a$, is serving an incoming leg and it is in pre-answer state. If the mode of the connection is send-receive, then SSCb audits the corresponding connection at the other end. If the connection mode of that endpoint, $E_b$, is inactive or receive-only, then the far end is handling the incoming leg while the endpoint $E_a$ is handling the outgoing leg and the call is in pre-answer state. However, connection mode of $E_b$ is send-receive also, then the call is in the answer state.

If the SSC that controls SSC is the $3^{rd}$ SSCc, then SSCb will send a new control message to SSCc to request to see if SSCc is serving the incoming leg for that connection. SSCc will respond accordingly. SSCb will request SSCc to communicate with SSCb for that connection instead of with SSCa from now onwards using another new control message.

c. An Accounting record (or call detail record) is created in the SSC that serves the incoming leg of the call (this SSC is also known as the originating SSC). This implies that if SSCa is the originating SSC, then accounting information is lost. SSCb releases all pre-answer calls that were previously served by SSCa as the originating SSC. This results in sending ISUP REL, MGCP DLCX and SIP CANCEL messages as appropriate to the PSTN side, GW endpoints and to a SSCc (if the $3^{rd}$ SSC was involved). For answered calls SSCb may choose to release the call after playing an announcement, or keep the calls up but will not be able to bill them.

d. If the incoming leg was served by another SSCc, then the call is kept up since accounting information will be available and therefore, the call can be billed.

7. If a new IAM using PC1 is received by SSCb, the new call is processed. (A new IAM may also trigger step 4 above.) SSCb will also send an IAM with PC1 for new calls that exit over GW1 or GW2.

Scenario 2: Failover to Backup SSCb when all Links to SSCa Fails

In the second scenario, no calls are dropped based on the use of a new software component termed FailoverMgr. This component receives information on a current call that can help a backup SSC to reconstruct accounting information. The FailoverMgr component may also receive "heartbeats" from the SSCs it serves. The FailoverMgr component may be integrated with a GW or it may be physically separate. In general, FailoverMgr can appear as a primary and backup redundant process to provide reliability. The primary FailoverMgr can update the backup FailoverMgr with the current information.

Steps 1–3 happen as in scenario 1. However, in step 1 after receiving IAM, a corresponding SSC will update the FailoverMgr component with information about the new call, such as, ANI, Destination Number, CIC endpoint and any other SSC involved through SIP. If calls are answered, then the FailoverMgr component will also contain the time of answer.

4. Turning on PC1 processing can be initiated as stated in Step 4 of scenario 1. However, if the FailoverMgr component is receiving heartbeats from failed SSCa, it can quickly let SSCb know of the situation (whichever happens first). The FailoverMgr component can also in parallel tell the GWs to start communicating with SSCb.

5. Steps 5a–b,d takes place as in scenario 1. In place of step c in scenario 1, SSCb obtains information from FailoverMgr, that helps it to recreate accounting information. Connections that could not be correlated by this process due to very abnormal situations are released.

6–7. As in scenario 1.

Scenario 3: SSCa Comes Back

After a failure of an SSC, the SSC may be brought back on-line after having been repaired or replaced. Scenario 3 represents the actions taken when SSCa comes back up.

1. SSCa contacts its backup SSCb.

2. SSCa contacts its controlled GWs to ask them to send messages/responses to it rather than to SSCb.

3. SS7 links to SSCa get activated through standard SS7 procedures.

4. SSCb provides SSCa with the current state information pertaining to calls at endpoints in GWs controlled by SSCa (i.e. GW1 & GW2 for the current example network).

5. SSCb lets the other SSC, if involved, in the set of calls currently being processed, to communicate with SSCa from now on.

6. SSCb updates its routing table back to the way it was.

7. If a FailoverMgr is involved it gets updated accordingly.

Through the above procedure neither active nor pre-answered calls are torn down when SSCa comes back up. Step 1–3 can happen in parallel. Steps 4–6 can happen in parallel and must start after step 1. Step 7 happens after changeover to SSCa is successful.

This changeback scenario can easily be generalized to support the case of multiple backup SSCs of scenario 4.

Scenario 4: Multiple SSCs Act as Backup for a Failed SSC

This may be necessary if the failed SSC is a larger SSC than the other SSCs that are to be its backup. Also, if backup SSC is already handling lot of traffic, it will be prudent not to let a single SSC backup a failed SSC but share load with several backup SSCs. The circuits controlled by the failed SSC will be divided according to information pre-provisioned in the back up SSCs.

As an illustrative example, when SSCa fails then SSCb and SSCc each control half the number of circuits originally controlled by SSCa. In this scenario, there is impact on STPs. This scenario works with both scenarios 1 & 2.

Steps 1 and 2 work the same way as in scenario 1.

3. SS7 networks reroutes traffic to backup SSCs (i.e., SSCb and SSCc). In standard SS7, the destination PC (DPC) together with SLS (Signaling Link Selection) (these are fields in the SS7 MTP layer) is used for selecting a link. The DPC may point to a table that points to link sets of highest priority to reach the destination and the SLS is used to choose a link from this set through load balancing (i.e. load is uniformly distributed over all the links of highest priority reaching the destination). But in this case, the backed up SSCs are sharing load based on voice circuits. After SSCa links are down, load balancing must not be done just based on the traditional DPC and SLS among all the links that reaches the backup SSCs since some of the links reach SSCb and some reach SSCc. So a modification needs to be made to the STPs to include circuits to find a link. One possible implementation is to first use the current technique to find an outgoing link. To find an outgoing link, STP will do a database query with DPC and SLS to an internal database. Under normal condition, the database will return a link towards SSCa. However, when the links to SSCa are not available, the database will return a link value that actually refers to starting Circuit (CIC) based routing instead of referring to an actual link. STP will then start procedures to find outgoing link utilizing the CIC: STP will extract the Circuit Identification Code (CIC) (which identifies the voice circuit) from the ISUP layer of the ISUP message and use DPC,SLS,CIC to query a different internal database for obtaining the exact outgoing link. The database is going to have to be pre-provisioned with information to utilize the CIC information with DPC to point to a set of links and then the SLS will be utilized to load balance among that set. This way, if a voice circuit is meant to be controlled by backup SSCb, then signaling messages would only be sent over links that reaches SSCb and not any of the other backup SSCs.

4. Step is same as step 4 of scenario 1 except that there are multiple backup SSCs involved in this scenario. Note that some endpoints (circuits) of a GW may have to communicate with backup SSCb and others with SSCc. The GWs must be provisioned with such capabilities.

5. SSCb and SSCc turn on processing for PC1:

a. the backup SSC's route tables will be updated as follows: Any destination that needs to be routed over SSCa will be changed to be processed by the SSC itself unless the circuit belongs to the other backup SSCs and in that case it will point to the other SSCs.

b. Same as step 5b of scenario 1; however, each SSC only obtains information about endpoints that it is assigned to control.

c. Same as step 5c of scenario 1. If FailoverMgr in scenario 2 is included, then step 5c modification of scenario 2 is followed.

d. Same as step 5d of scenario 1.

6–7. Same as step 6–7 of scenario 1

Scenario 5: Backing Up During Congestion

If level 3 congestion is experienced in SS7 network, it sends SS7 MTP layer messages called Transfer Controlled (TFC) towards an originating side. Messages for the destination are throttled or discarded. If an SSC, e.g. SSCa, experiences congestion, TFC messages will be generated from SSCa's home STP pair to the SS7 network. Then, new calls will be processed by a backed up SSC on a call-by-call basis.

According to the present invention, IAM-based routing may also be used. Standard routing and CIC based routing were discussed previously in scenario 4. If an STP had received a TFC for SSCa, then for every newly received SS7 ISUP packet eligible for discarding, the STP should look at the ISUP message type in the ISUP SS7 packet. If the ISUP message type is IAM, then the STP will route calls over a link of lower priority to a backup SSC.

A backup SSCb receiving the IAM destined for PC1 will process the new call on behalf of the congested SSCa. SSCb will only need to communicate with a GW's endpoint E over which the call originated SSCb will have pre-provisioned information to match the CIC to the endpoint of the GW controlled by SSCa. SSCb will not have to go through the extensive auditing as in step 5b of scenario 1. There is no update to route table since this is on a call be call basis only. After call is over, the endpoint E is reset to communicate with the default SSCa.

Scenario 6: 3rd Party Backup

It is also possible to backup an SSC using a third party SSC (potentially generating new revenue). Providing this capability generally may require administrative arrangements between different carriers.

Although the above description has been made with reference to utilizing MGCP & SIP VoIP protocols, it should be appreciated that other well-known protocols (e.g., H.248 (MEGACO), H.323) or a protocol that may be utilized in the future can also be used.

As used herein, difficulty of a switch is defined as any non-normal condition of the switch (e.g., congestion, incoming link failure, outgoing link failure, software failure, and hardware failure).

Figure 5:
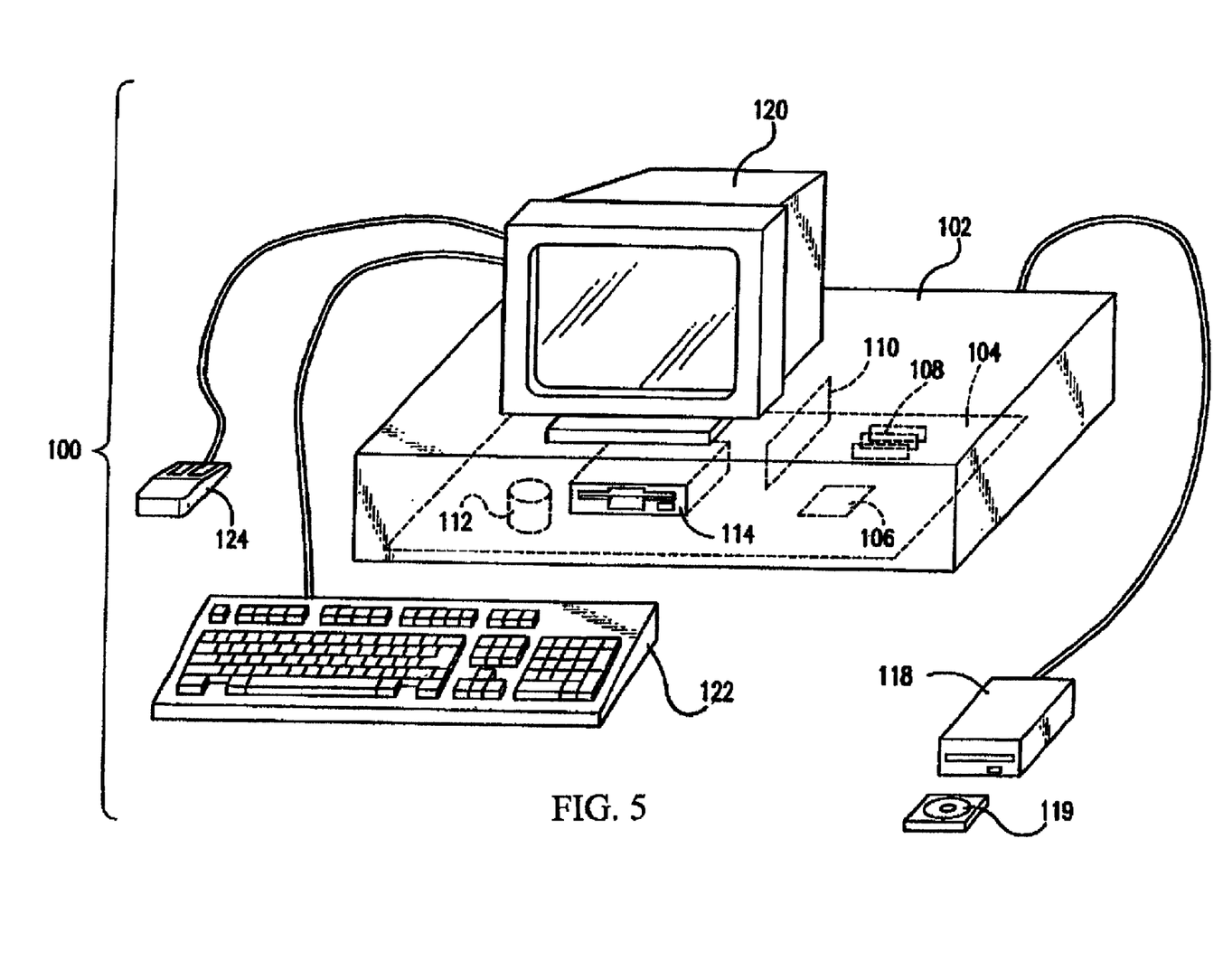
FIG. 5 is a general diagram of a computer for controlling the switching and control functions of the present invention.

FIG. 5 is a schematic illustration of a computer system for controlling the switching and control operation of at least one of the SSCs, STPs and GWs according to the present invention. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of the status of individual SSCs, STPs, and/or GWs.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for controlling the switching and control operation of at least one of the SSCs, STPs and GWs according to the present invention. The computer code devices of the present invention can be any interpreted or executable code mechanism, including but not limited to scripts, interpreters, dynamic link libraries, Java classes, C/C++ and complete executable programs.

Such software and/or hardware may be intergrated into switches and controllers used in the present invention (e.g., in SSCs, STPs and GWs) and need not be in stand-alone computers (e.g., running Windows 95/98/ME/2000/NT, Linux, Unix, and Unix variants (e.g., HP-UX, SYSTEM V, Solaris). Moreover, plural of the components (e.g., an SSC, STP or GW) may be integrated into a single hardware or software system without a loss of generality. Nonetheless, different SSCs are preferably implemented on different computers.

The system further includes networking hardware (e.g. Ethernet cards, token ring cards, ATM cards, and/or FDDI cards) and software to connect to IP networks, so that computers can communicate with each other (e.g., using MGCP & SIP). An SS7 hardware card also terminates SS7 signaling links to the PSTN while the GWs have voice circuits terminations (e.g., using T1, E1 or lines).

Obviously, numerous modifications and variations of the present invention are possible in light of the above teachings. It is therefore to be understood that, within the scope of the appended claims, the invention may be practiced otherwise than as specifically described herein.

The invention claimed is:

1. A computer program product, comprising: a computer readable storage medium and a computer executable program code in the computer storage medium for causing a switch to control redundant signaling operations, the computer program code mechanism comprising:
   a first computer code device configured to identify a first switch for which a second switch is to act as a backup, wherein the first and second switches are remotely located and independently addressable with unique first and second addresses, respectively, when the first and second switches are not experiencing difficulty;
   a second computer code device configured to receive periodic messages indicating that the first switch is functioning properly;
   a third computer code device configured to receive a message indicating that the first switch is experiencing difficulty; and
   a fourth computer code device controlling the second switch configured to emulate the unique first address of the first switch and route calls on behalf of the first switch when the first switch is experiencing difficulty.

2. The computer program product as claimed in claim 1, wherein the third computer code device configured to receive a message indicating that the first switch is experiencing difficulty comprises a fifth computer code device configured to receive a message indicating that the first switch is experiencing congestion.

3. The computer program product as claimed in claim 1, wherein the third computer code device configured to receive a message indicating that the first switch is experiencing difficulty comprises a fifth computer code device configured to receive a message indicating that the first switch is experiencing an error.

4. The computer program product as claimed in claim 1, wherein the third computer code device configured to receive a message indicating that the first switch is experiencing difficulty comprises a fifth computer code device configured to receive a message intended for the first switch.

5. The computer program product as claimed in claim 1, further comprising a fifth computer code device configured to receive a message from the first switch when the first switch is no longer experiencing the difficulty.

6. The computer program product as claimed in claim 1, wherein the third computer code device comprises a fifth computer code device configured to receive SS7 messages.

7. The computer program product as claimed in claim 6, wherein the fifth computer code device comprises a sixth computer code device configured to receive SS7 messages using point codes as the unique first and second addresses.

8. The computer program product as claimed in claim 1, wherein the first and second switches control first and second disjoint sets of voice gateways, respectively, when the first and second switches are not experiencing difficulty.

9. The computer program product as claimed in claim 8, further comprising a fifth computer code device configured to enable the second switch to control both of the first and second sets of voice gateways when the first switch is experiencing difficulty.

10. A switch for use in a packet voice environment, the switch comprising:
    a memory to identify another switch for which the switch is to act as a backup, wherein the another switch and the switch are remotely located and independently addressable with unique first and second addresses, respectively, when the first and second switches are not experiencing difficulty;
    a first receiver configured to receive periodic messages indicating that (1) the another switch is functioning properly and (2) the another switch is experiencing difficulty; and
    a controller for controlling the switch to route calls on behalf of the another switch by emulating the unique first address of the another switch when the another switch is experiencing difficulty.

11. The switch as claimed in claim 10, wherein the receiver is configured to receive a message indicating that the another switch is experiencing congestion.

12. The switch as claimed in claim 10, wherein the receiver is configured to receive a message indicating that the another switch is experiencing an error.

13. The switch as claimed in claim 10, wherein the receiver is configured to receive a message intended for the another switch.

14. The switch as claimed in claim 10, wherein the receiver further comprises a decoder for receiving a message from the another switch when the another switch is no longer experiencing the difficulty.

15. The switch as claimed in claim 10, wherein the receiver comprises an SS7 message receiver.

16. The switch as claimed in claim 10 wherein the receiver comprises an SS7 message receiver using point codes as the unique first and second addresses.

17. The switch as claimed in claim 10, wherein the another switch and the switch control first and second disjoint sets of voice gateways, respectively, when the first and second switches are not experiencing difficulty.

18. The switch as claimed in claim 17, further comprising a controller configured to enable the switch to control both of the first and second sets of voice gateways when the another switch is experiencing difficulty.

* * * * *